Nov. 4, 1952 J. A. DEUBEL 2,617,000
PEAK LOAD LIMITER
Filed Sept. 10, 1949 2 SHEETS—SHEET 1
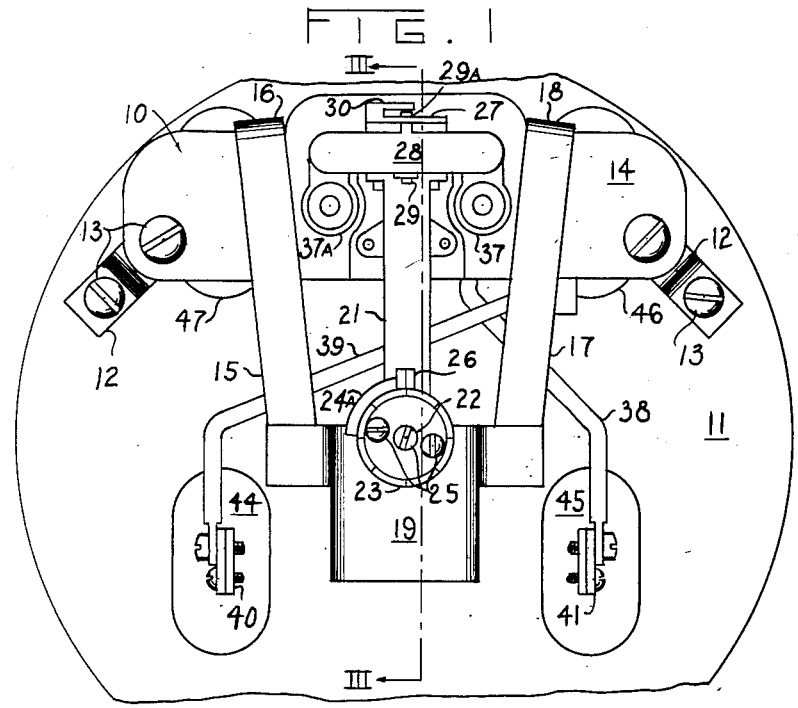
INVENTOR.
JUSTIN A. DEUBEL
BY
Tate & Weikart
ATTORNEYS Nov. 4, 1952 — J. A. DEUBEL — 2,617,000
PEAK LOAD LIMITER
Filed Sept. 10, 1949 — 2 SHEETS—SHEET 2
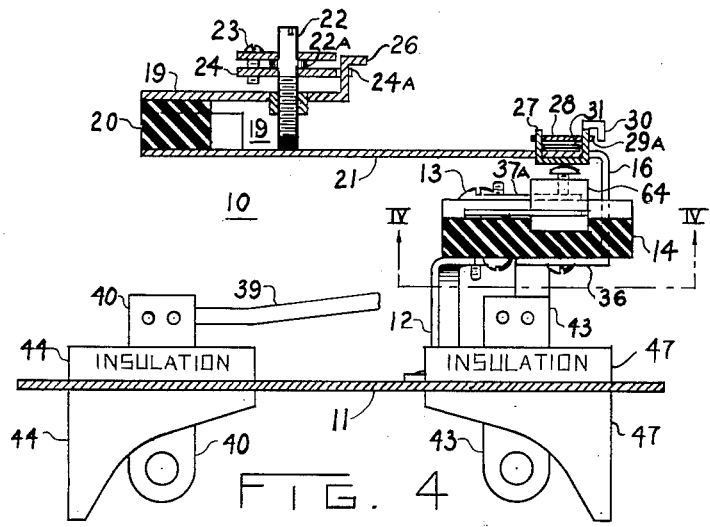
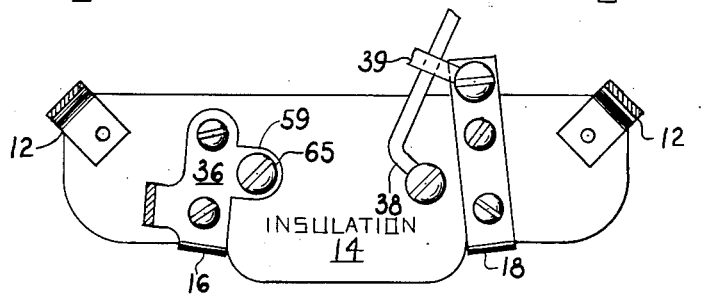
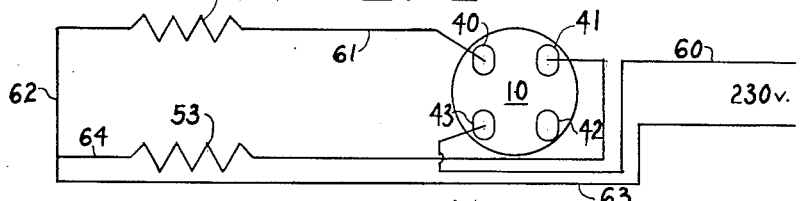
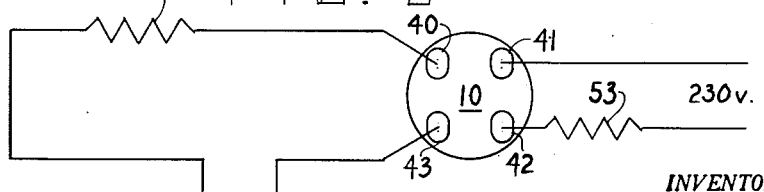
INVENTOR.
JUSTIN A. DEUBEL
BY Tate & Weikart
ATTORNEYS Patented Nov. 4, 1952

2,617,000

UNITED STATES PATENT OFFICE 2,617,000

PEAK LOAD LIMITER

Justin A. Deubel, Hales Corners, Wis., assignor to Perfex Corporation, Milwaukee, Wis., a corporation of Wisconsin Application September 10, 1949, Serial No. 115,040

2 Claims. (Cl. 200—113)

This invention concerns a type of protective apparatus for electric supply systems. Generally, it is an automatic electric demand controller to regulate the use of electric power by controlling the distribution of available capacity. More specifically, it is an object of this invention to limit the maximum amount of power used at any particular time to eliminate peak demands on the central supply station.

In the course of modern trends to complete electrification in the home, it has become a problem in central station operation to cope with the increasing number of peak demand periods that occur at certain hours of the day. This intermittent peak use requires the central station equipment to be of such a size as to take care of the total maximum demand load even though it be of very short duration. To circumvent this difficulty various types of peak limiters have come into use with varying degrees of successful application. This invention concerns an improved type of peak limiter that is unique in construction, successful in performance and effects a complete control of the electric supply system.

In essence it represents an improvement on the type of thermal relay as shown in the Patent 2,302,399 to A. G. Stimson.

In this description by way of example, the peak limiter is described as controlling portions of domestic load equipments, where the controlled load consumes power at the off-peak moments only and thereby limits the maximum load of the supply system. This allows an uninterrupted use of other heavy current carrying equipment, such as ranges, space heaters and the like. In this description for the sake of clarity and by way of example, the main or preferred load is taken as a kitchen range and the secondary or controlled load is assumed to be an electric water heater. For example, the peak limiter is used to automatically disconnect the water heater (regardless of call for heat from the hot water heater thermostat) when all or some part of the main load reaches a predetermined limit of say 10 kw. and automatically reconnect the heater when power demand of the main load drops to, let us say, 2 kw.

For a more complete understanding of this invention reference should be had to the accompanying drawings in which, Fig. 1 is a plan view of the peak limiter and its mounting plate;

Fig. 2 is an end view of the assembly;

Fig. 3 is a sectional side view taken along lines III—III of Fig. 1;

Fig. 4 is a sectional plan view taken along lines IV—IV of Fig. 3;

Fig. 5 is a wiring diagram showing a possible application of the peak limiter to a domestic system;

Fig. 6 is a wiring diagram showing an alternative method of application when a separate power supply circuit is required.

Referring now to Fig. 1, 2 and 3, the peak limiter is shown generally at 10 fastened to a mounting base or plate 11 by suitable supports or brackets 12 and secured by screws 13. The peak limiter 10 comprises an insulation base or switch plate 14 to which the various parts are attached. Essentially the peak limiter is composed of three bimetal strips and a switch. The bimetal 15 is fastened, by brazing or soldering, to a stiff bracket 16 of conductive material. This bracket 16 is bent around the insulation block 14 and fastened underneath, on the opposite side from the bimetal 15 (see Figs. 2 and 4). The other outer bimetal 17 is identical to bimetal 15 and is fastened to a stiff bracket 18, similar in construction and material to piece 16. Both brackets 16 and 18 furnish connections for current carrying conductors. The opposite ends of bimetals 15 and 17 are also fastened to a conductive bracket 19 which allows current to flow from piece 16, through bimetal 15, bracket 19, bimetal 17 and out piece 18. The bracket 19 also serves as a support for an insulation block 20 to which the third bimetal 21 is attached. Note that the bracket 19 is a conductive bridge between bimetals 15 and 17 but the block 20 insulates bimetal 21 from the other two bimetals 15 and 17. The bimetal 21 acts as the actuating arm for the switch (to be later described) but is constructed of bimetal to compensate for ambient fluctuations which affect all three bimetals. Abutting bimetal 21 and supported by bracket 19 is an adjusting screw 22. This screw 22 enables the operator to adjust the distance between bimetal 21 and the bracket 19 to furnish a range adjustment for the limiter. Because the bimetal 21 is attached securely to the insulation block 20, any adjustment of screw 22 will affect the opposite end of bimetal 21 and change the position of the contact mechanism carried thereon.

Concentric with screw 22 and resting on collar 22A is a range indicating disc 23. Below disc 23 and collar 22A is a second disc 24 having a lobe portion 24A. The discs 23 and 24 are fastened together, but spaced by collar 22A, by screws 25. With this arrangement, when screws 25 are tightened, adjustment of screw 22 also revolves both discs 23 and 24. The movement of this assembly 22, 23 and 24 is limited by a stop and indicating pointer 26 which abuts the lobe 24A in either direction of rotation. Loosening the screws 25 will permit the operator to adjust the screw 22 independently of the discs 23 and 24 and therefore allow a new range of operation when the screws 25 are re-tightened. This provides a means for calibration of the device.

The opposite end of bimetal 21 is securely fastened to a bracket 27 which flexibly holds a switch arm 28. The switch arm 28 is pivoted on the bracket 27 by means of two projections 29 and 29A of switch arm 28. The switch arm 28 is held in place after assembly by a downwardly turned portion 30 of the bracket 27. This portion 30 abuts the projection 29A. Fastened to the switch arm 28 is a thin strip 31 of conductive material to which the movable contacts 32 and 34 are attached. Note that contact 32 is also secured to the switch arm 28 but contact 34 is attached only to the thin strip 31. This arrangement of the switch contacts 32 and 34 allows for better switch contact break and make between the movable contacts 32 and 34 and the opposing stationary contacts 33 and 35, but forms no part of the present invention. The stationary contacts 33 and 35 are connected to conductive strips 37A and 37 respectively which are fastened to the insulation base 14. These conductive strips 37A and 37 have projections extending through the base 14 to the opposite side thereof. Referring to Fig. 4, conductor 38 is attached to the projection of strip 37 and terminal 65 to the projection of 37A.

Thus, contact 33 is connected to the bimetal 15 by means of conductor 37A and bracket 16. Also contact 33 is connected to terminal 43 through conductor 36 and bracket 16. Terminal 43 is fastened to the base 11 by insulator 47. The contact 35 is connected to the conductor 38 through conductor 37. This conductor 38 is attached at its other end to a terminal 41 fastened to the base plate 11 by insulation post 45. Leading from conductor bracket 18 of bimetal 17 is another conductor 39 which connects to a terminal 40 fastened to the base plate by insulation post 44 (Fig. 1). A fourth terminal 42 is also fastened to the base plate 11 by insulation post 46 but is not connected to the limiter as shown in Fig. 5.

Referring now to Fig. 5 in which is shown a circuit diagram embodying one adaptation of the limiter to a load circuit. The peak limiter 10 is shown in miniature as viewed from the bottom of the mounting plate 11. The range or similar load is shown at 52. The water heater load is shown at 53. The lead 60 from the power supply source is connected to terminal 43. Terminal 43, as stated before, is also connected to bimetal 15 through the connectors 36 and bracket 16. Also, the bimetal bridge composed of bimetal 15, bracket 19, and bimetal 17 is a current carrying path. The bimetal 17 connects to bracket 18, conductor 39 and to terminal 40. Thus the bimetal bridge 15—19—17 is effectively across the terminals 40 and 43.

The circuit is now traced from the terminal 40 through conductor 61, range load 52, conductor 62, conductor 63 and to the other side of the power supply, completing the range circuit. Thus the range load 52 (when range switches are closed) and the bimetal bridge 15—19—17 are always in a closed circuit to the power source.

The circuit for the secondary or water heater load can be traced as follows: Power source, conductor 63, conductor 64, water heater load 53, terminal 41 (conductor 38, piece 37, contact 35, contact 34, strip 31, switch arm 28, contact 32, contact 33, piece 37A, piece 36 to terminal 43— see Figs. 1 and 2), terminal 43, lead 60 and 50 back to the other side of the power supply line. Thus the switch contacts are effectively across the terminals 41 and 43, and control the energization of the heater load.

Operation according to Figs. 1, 2, 3, 4, and 5 as shown:

Due to the above mentioned wiring arrangement, it is apparent that under conditions when the water heater thermostat (not shown) is calling for heat and its contacts are closed, energization of the heater circuit can be attained by the closing of the switch contacts 32—33 and 34—35.

In the operation of the peak limiter, with the current adjustment screw 22 set at a current based upon the desired maximum current to be carried by the range load prior to cut out, any current flow through the range circuit less than the desired maximum will not operate the switch contacts from the closed position. However, the current flow through the range circuit will generate heat in the bimetals 15 and 17 causing them to flex downwardly but not sufficiently to actuate the contacts. It is to be noted that any movement or flexing of the bimetals 15 and 17 is communicated to the bracket end 19 of the structure and not to the stiff brackets 16 and 18. Thus the downward movements of bimetals 15 and 17 cause the insulator 20 and the bimetal 21 affixed thereto to move in accordance with the bimetal movements and to tend to raise up the switch end 28 of bimetal 21.

However, if the housewife is using an amount of current on the range circuit that is in excess of the amount for which the current adjustment screw 22 is set, then the bimetals 15 and 17 will flex downwardly carrying the insulator end 20 of bimetal 21 downwardly and cause the switch contacts to snap open, opening the water heater circuit.

The contacts 32—34 and 34—35 will remain open as long as the bimetals 15 and 17 remain flexed downwardly. The bimetals remain flexed downwardly during such time as the heat generating current through bimetals 15 and 17 remains at the level set by the screw 22.

If the housewife shuts off the range or otherwise decreases the amount of current drain in the range circuit the bimetals 15—17 will flex upwardly forcing the insulator end 20 of bimetal 21 upwardly until the magnet 64 (located beneath the switch arm bracket 27) snaps the contacts closed. Thus the heater circuit is again closed and ready for a demand for heat from the hot water thermostat (not shown). Therefore, it is obvious that any current flow in the range circuit in excess of a predetermined and set value will prohibit energization of the water heater circuit.

Referring now to Figs. 6 and 4, in Fig. 6 is shown an alternative method of connecting the limiter when separate sources of supply are required for the range and heater load. In order for the limiter to function properly in this circuit it is necessary to cut away the projecting ear 59 from the conductor piece 36. Thus 59 is now only attached to the switch contact 33. Conductor piece 36 remains a part of the circuit to the bimetal 15 and the terminal post 51. A conductor is now fastened from this ear 59 to the heretofore blank terminal post 42. The limiter is then ready for dual power supply operation. Note that in Fig. 6 the switch is effectively now across terminals 41 and 42 instead of across 41 and 43 as in Fig. 5.

The operation of the limiter is functionally the same as in Fig. 5. An excess of current through the range 52 circuit will heat the bimetals 15 and 17 and open the switch contacts. The difference between the two circuits, Figs. 5 and 6, lies in the ability in Fig. 6 to use two separate power sources, such as 230 v. and 115 v. when different voltages are required.

Various modifications coming within the spirit of the invention may suggest themselves to those skilled in the art and hence the invention is not to be limited to the specific form shown, except to the extent indicated in the appended claims.

What is claimed is:

1. A switching mechanism for controlling a first circuit through said switching mechanism in response to the current carried by a second circuit through said switching mechanism comprising, a mounting base having terminal posts mounted thereon, a switch plate mounted on said base in spaced relation thereto, two U-shaped members mounted on said switch plate each having one leg extending along the underside of said switch plate and having means providing electrical connecting terminals thereon, the other legs of said members overlying said switch plate and spaced therefrom, said other legs each having rigidly secured thereto a bimetallic arm responsive to the heating effect of current flow therethrough, said arms being coextensive, an electrical conducting bracket secured to the free ends of said arms, a flexible arm coextensive with said bimetallic arms and rigidly mounted on but electrically insulated from said bracket, contact means including a movable contact carried by the free end of said flexible arm and a fixed contact mounted on said switch plate for cooperation with said movable contact, means electrically connecting said terminal posts on said base with said terminals on said members and with said contact means whereby said bimetallic arms are connected in series with said second circuit and said contact means is connected in series with said first circuit.

2. A switching mechanism for controlling a first circuit through said switching mechanism in response to the current carried by a second circuit through said switching mechanism comprising, a mounting base having terminal posts mounted thereon, a switch plate mounted on said base in spaced relation thereto, two U-shaped members mounted on said switch plate and each having one leg extending along the underside of said switch plate and having means providing electrical connecting terminals thereon, the other legs of said members overlying said switch plate and spaced therefrom, said other legs each having rigidly secured thereto a bimetallic arm responsive to the heating effect of current flowing therethrough, said arms being coextensive, an electrical conducting bracket secured to the free ends of said arms, a bimetallic compensating arm rigidly mounted on but electrically insulated from said bracket and coextensive with said first mentioned arms adapted to compensate for ambient temperature variations, means for adjustably positioning the free end of said compensating arm with respect to said bracket, snap-acting contact means including a bridging contact structure and an armature carried by the free end of said compensating arm, fixed contacts and a magnet mounted on said switch plate opposite said bridging contact structure and said armature respectively, and means electrically connecting said terminal posts on said base with said terminals on said members and with said fixed contacts whereby said first mentioned bimetallic arms are connected in series with said second circuit and said fixed contacts are connected in series with said first circuit.

JUSTIN A. DEUBEL.

REFERENCES CITED

The following references are of record in the file of this patent:

UNITED STATES PATENTS

| Number | Name | Date |
| --- | --- | --- |
| 1,849,280 | Chandler | Mar. 15, 1932 |
| 2,280,960 | Lee | Apr. 28, 1942 |
| 2,284,383 | Elmer | May 26, 1942 |
| 2,460,837 | Malone | Feb. 8, 1949 |
| 2,518,361 | Mosley | Aug. 8, 1950 |